US012603681B2

(12) United States Patent
Chen et al.

(10) Patent No.: US 12,603,681 B2
(45) Date of Patent: Apr. 14, 2026

(54) PRECODING PROCESSING METHOD AND COMMUNICATION APPARATUS

(71) Applicant: HUAWEI TECHNOLOGIES CO., LTD., Guangdong (CN)

(72) Inventors: Lei Chen, Shenzhen (CN); Fengwei Liu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/411,187

(22) Filed: Jan. 12, 2024

(65) Prior Publication Data

US 2024/0223245 A1     Jul. 4, 2024

Related U.S. Application Data

(63) Continuation of application No. PCT/CN2022/108851, filed on Jul. 29, 2022.

(30) Foreign Application Priority Data

Aug. 6, 2021     (CN) .......................... 202110901965.8

(51) Int. Cl.
    *H04B 7/04*        (2017.01)
    *H04B 7/0456*    (2017.01)
(52) U.S. Cl.
    CPC .................................. *H04B 7/0456* (2013.01)
(58) Field of Classification Search
    CPC .................................................... H04B 7/0456

(Continued)

(56) References Cited

U.S. PATENT DOCUMENTS

| 2004/0017853 A1* | 1/2004 | Garrido | ................ | H04N 9/8042 |
| | | | | 375/E7.199 |
| 2013/0182794 A1* | 7/2013 | Ringstrom | ........... | H04B 7/0456 |
| | | | | 375/296 |

(Continued)

FOREIGN PATENT DOCUMENTS

WO        2021128289 A1    7/2021

OTHER PUBLICATIONS

Fraunhofer Ils et al: "Further Enhancements on Type-II CSI Reporting: Doppler-domain Approach", 3GPP Draft; R1-1904219, 3rd Generation Partnership Project (3GPP), Mobile Competence Centre; 650, Route Des Lucioles; F-06921 Sophia-Antipolis Cedex; France, vol. RAN WG1. No. Xi'an, China; Apr. 8, 2019-Apr. 12, 2019, Mar. 29, 2019 (Mar. 29, 2019), XP051691357, total 6 pages.

(Continued)

*Primary Examiner* — Kevin M Burd
(74) *Attorney, Agent, or Firm* — Rimon PC

(57) ABSTRACT

A transmitting apparatus determines precoding information that includes one or more of the following: a precoding codebook, a power of a precoding port, a power of a precoding data stream, and a correspondence between the precoding port and the precoding data stream. Here one or more precoding ports may correspond to one precoding data stream. The transmitting apparatus transmits the precoding information to a receiving apparatus, so that the receiving apparatus can transmit downlink data with reference to the precoding information. In this application, the transmitting apparatus feeds back more types of precoding information than previously taught by prior art, so that the receiving apparatus obtains more reference information when transmitting the downlink data.

20 Claims, 4 Drawing Sheets

(58) Field of Classification Search
USPC ......................................................... 375/267
See application file for complete search history.

(56) References Cited

U.S. PATENT DOCUMENTS

| | | | | |
|---|---|---|---|---|
| 2019/0103902 A1* | 4/2019 | Gao | ..................... | H04B 7/0626 |
| 2022/0217646 A1* | 7/2022 | Huang | .................. | H04L 5/0048 |

OTHER PUBLICATIONS

Huawei et al: "Remaining issues on full power transmission for UL MIMO". 3GPP Draft; R1-1911904, 3ROD Generation Partnership Project (3GPP), Mobile Competence Centre; 650. Route Des Lucioles; F-06921 Sophia-Antipolis Cedex; France, vol. RAN WG1, No. Reno, USA; Nov. 18, 2019-Nov. 22, 2019, Nov. 9, 2019 (Nov. 9, 2019), XP051823086, total 12 pages.

* cited by examiner

100

200

Frequency
domain data
of a port x
Frequency
domain
precoding
Amplitude
Phase
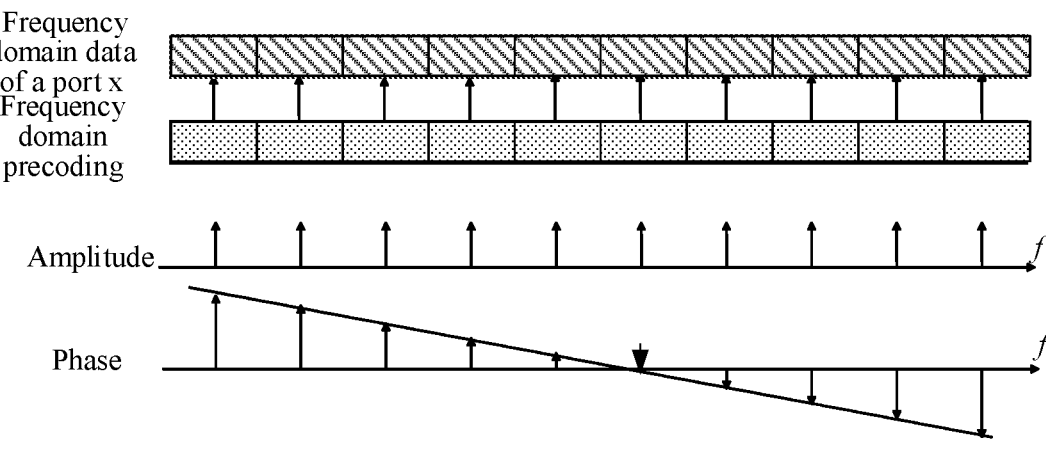
FIG. 4
Cyclic shift
Frequency
domain data
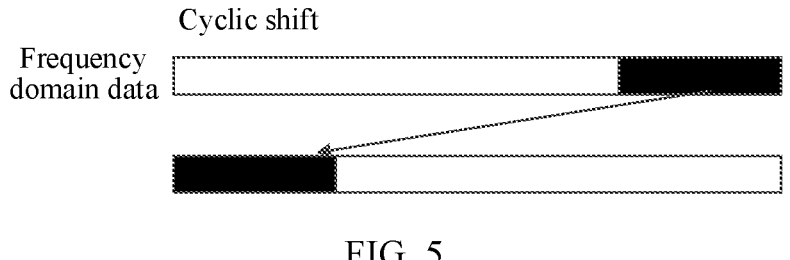
FIG. 5
Non-cyclic
shift
Frequency
domain data
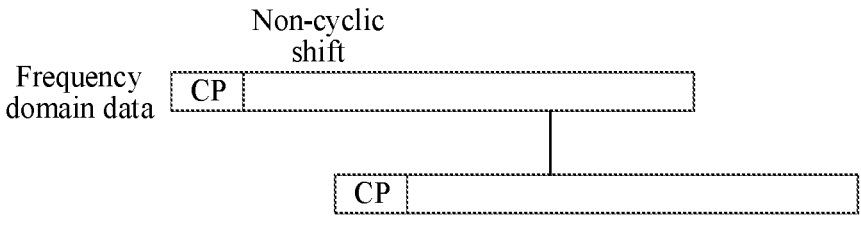
FIG. 6
| Transceiver unit 72 |
|---|
| Processing unit 71 |
FIG. 7

PRECODING PROCESSING METHOD AND COMMUNICATION APPARATUS

CROSS-REFERENCE TO RELATED APPLICATIONS

This application is a continuation of International Application No. PCT/CN2022/108851, filed on Jul. 29, 2022, which claims priority to Chinese Patent Application No. 202110901965.8, filed on Aug. 6, 2021. The disclosures of the aforementioned applications are hereby incorporated by reference in their entireties.

TECHNICAL FIELD

This application relates to the field of communication technologies, and in particular, to a precoding processing method and a communication apparatus.

BACKGROUND

A value of a peak to average power ratio (PAPR) directly determines a requirement for the dynamics of a power amplifier power at a transmit end. A higher PAPR indicates a higher requirement for the power dynamics at the transmit end, thus higher costs of the power amplifier. In addition, if the PAPR imposes an requirement for the dynamics of the power at the transmit end that exceeds an upper limit of a component in the power amplifier, an output power of the power amplifier needs to be backed off to ensure linearity. Power back-off means that output efficiency of the power amplifier becomes lower, power consumption is increased, and system coverage performance is degraded. Therefore, a waveform with a low PAPR in a transmit signal is naturally attractive.

Compared with orthogonal frequency division multiplexing (OFDM), single-carrier transmission has the advantage of a low PAPR. Compared with an OFDM waveform, a single-carrier waveform has the disadvantage that the capacity of the single-carrier waveform is not as good as the capacity of the OFDM waveform. In addition, the OFDM waveform can easily support user frequency division. However, as a frequency band further expands, the process limitation of a power amplifier is more apparent. Consequently, even if OFDM transmission is used on the base station side, many trade-offs (increased back-off and degraded coverage) must be made. Therefore, using single-carrier transmission on a higher frequency band becomes a trend. However, the information transmission manner in an OFDM system cannot be directly introduced to a single-carrier information transmission system.

SUMMARY

This application provides a precoding processing method and a communication apparatus, to ensure a low PAPR during data transmission, for example, single-carrier data transmission.

According to a first aspect, this application provides a precoding processing method. The method may be implemented through interaction between a receiving apparatus and a sending apparatus, or may be implemented by the receiving apparatus or the sending apparatus. The receiving apparatus may be understood as a network device, for example, a transmission reception point (TRP) or a 5G base station (gNodeB, gNB), or may be understood as a module (for example, a chip) in the network device. The sending apparatus may be understood as a terminal device, for example, user equipment (UE) or a vehicle-mounted device, or may be understood as a module (for example, a chip) in the terminal device. This is not specifically limited in this application.

The sending apparatus may determine precoding information, where the precoding information may include one or more of the following: a precoding codebook, a power of a precoding port, a power of a precoding data stream, or a correspondence between the precoding port and the precoding data stream, where one or more precoding ports correspond to one precoding data stream. The sending apparatus transmits the precoding information to the receiving apparatus. The receiving apparatus may transmit data with reference to the precoding information.

It should be noted that the precoding information actually indicates a mapping relationship between the precoding port and the precoding data stream. The precoding information may include the precoding codebook, the power of the precoding port, the power of the precoding data stream, the correspondence between the precoding port and the precoding data stream, a random combination of the foregoing information, or the like. This is not specifically limited in this application. Because the receiving apparatus may receive the precoding information from a plurality of sending apparatuses, it is unreasonable to directly send downlink data based on one piece of precoding information. After data processing is performed, a downlink data transmission status is determined with reference to a plurality of pieces of precoding information. This can ensure low PAPR and can accommodate the requirement of more sending apparatuses.

In this application, the terminal device feeds back more types of precoding information, so that the network device obtains more reference information when transmitting the downlink data. In addition, each precoding port corresponds to one precoding data stream, so that a feature of a low PAPR of the precoding codebook can be ensured. When the precoding codebook fed back by the terminal device has the low PAPR, the network device can ensure the low PAPR during downlink data transmission as much as possible.

In an optional manner, the precoding codebook includes one of the following: a frequency domain codebook, a time domain codebook, or a delay domain codebook.

The frequency domain codebook is a codebook in which amplitudes of subcarriers are the same and a phase difference between the subcarriers is constant within a preset frequency band range. Optionally, the frequency domain codebook may be defined by using another frequency unit as a granularity. For example, the granularity of the frequency domain codebook may be a set of a plurality of subcarriers (for example, the granularity is a resource block or a resource block group), or may be an absolute frequency bandwidth (for example, 120 kHz or 12 kHz). A frequency domain codebook of a frequency domain unit is universal to a current multi-carrier precoding manner. The time domain codebook is defined more simply. In addition, all frequencies of an entire port are processed consistently. This is more applicable to a large-bandwidth scenario. Based on a time domain, the delay domain codebook introduces a precoding dimension of a delay, to better match delays between different ports and improve performance.

In an optional manner, the precoding codebook is as follows:

$$A_{K,L} = \begin{bmatrix} a_{1,1} & a_{2,1} & \cdots & a_{1,l} & \cdots & a_{1,L} \\ a_{2,1} & a_{2,2} & & & & \\ \vdots & & \ddots & & & \\ a_{k,1} & & & \ddots & & \\ \vdots & & & & \ddots & \\ a_{K,1} & & & & & a_{K,L} \end{bmatrix},$$

where

K indicates a quantity of precoding ports; L indicates a quantity of precoding data streams; $\alpha_{K,L}$ indicates precoding of a $K^{th}$ port in an $L^{th}$ data stream; and each row of $A_{K,L}$ has at most one non-zero element. Optionally, each column has at least one non-zero element. The foregoing constraint ensures that at most one data stream is sent on a same port. Different streams do not overlap on a same port, and a PAPR is not damaged.

In an optional manner, when the precoding codebook is the frequency domain codebook, the non-zero element $\alpha_{K,L}$ in the precoding codebook is $\lambda_K \cdot e^{1*\phi_{K,L}(n))}$; $\lambda_K$ indicates an amplitude and a common phase value of precoding of the port K; and $\phi_{K,L}(n)$ indicates a phase value of mapping the $L^{th}$ data stream to the $K^{th}$ port on an $n^{th}$ frequency domain resource.

In an optional manner, when the precoding codebook is the delay domain codebook, the non-zero element $\alpha_{K,L}$ in the precoding codebook is $\varpi_K \cdot \delta(t-\tau_{K,L})$; $\varpi_K$ indicates an amplitude and a phase value of precoding of the port K; $\delta(t-\tau_{K,L})$ is an impulse function; and $\tau_{K,L}$ indicates a delay shift value of mapping the $L^{th}$ data stream to the $K^{th}$ port.

In an optional manner, before determining the precoding information, the sending apparatus further receives reporting configuration information.

The reporting configuration information includes one or more of the following: the correspondence that is between the precoding port and the precoding data stream and that is selected by the sending apparatus, the codebook selected by the sending apparatus, reporting the power of the precoding data stream, and the power of the precoding port. The sending apparatus transmits the precoding information based on the reporting configuration information. Reporting of information about the power of a port helps allocate the power of the port to another port with better quality for sending when the total power of the port is limited (due to regulations, a component capability, or the like), to improve precoding performance. When the quality of a plurality of streams of a channel differs greatly, an inter-stream power may balance a signal quality level of each stream, to maximize a multi-stream transmission gain.

In an optional manner, there are a plurality of correspondences between the precoding port and the precoding data stream. The sending apparatus selects one of the plurality of correspondences between the precoding port and the precoding data stream. A plurality of correspondences between a port and a data stream are preconfigured by the base station. The advantage of doing so is that the correspondences may be configured as required based on an actual channel environment of each terminal. For example, the performance of a second stream differs from the performance of a first stream, and more ports may be allocated to the second stream to implement inter-stream balance.

In an optional manner, the power of the data stream includes one or more of the following: an inter-stream power coefficient or an inter-stream power difference. The inter-stream power coefficient indicates a power difference value that is between two data streams and that is reported by the sending apparatus. The inter-stream power difference indicates a power difference value that is between M data streams and that is reported by the sending apparatus. M is greater than 2. When the quality of a plurality of streams of a channel differs by an amount that exceeds certain limit, an inter-stream power may balance a signal quality level of each stream, to maximize a multi-stream transmission gain.

In an optional manner, the power of the precoding port includes: a power control coefficient of the port when an inter-port power is not borrowed; or a power allocation proportion of the port when an inter-port power is borrowed. Reporting of information about a power of a port helps allocate the power of the port to another port with better quality for transmission when the total power of the port is limited (due to regulations, a component capability, or another constraint), to improve precoding performance.

In an optional manner, the sending apparatus may receive configuration information of the inter-port power, where the configuration information of the inter-port power indicates a borrowing status of the inter-port power, for instance, whether a power of one or more ports can be borrowed from each other. The sending apparatus reports the power of the precoding port based on the configuration information of the inter-port power. Port borrowing information is configured, so that the terminal can determine whether a port can be enabled to provide an extra power for another port (or determine other ports) by sending less power.

According to a second aspect, this application provides a sending apparatus including a processing unit and a transceiver unit.

The processing unit is configured to determine precoding information, where the precoding information includes one or more of the following: a precoding codebook, a power of a precoding port, a power of a precoding data stream, or a correspondence between the precoding port and the precoding data stream, where one or more precoding ports may correspond to one precoding data stream. The transceiver unit is configured to transmit the precoding information.

In an optional manner, the precoding codebook includes one of the following: a frequency domain codebook, a time domain codebook, or a delay domain codebook.

The frequency domain codebook is a codebook in which the amplitudes of subcarriers are the same and a phase difference between the subcarriers is constant within a preset frequency band range.

In an optional manner, the precoding codebook is as follows:

$$A_{K,L} = \begin{bmatrix} a_{1,1} & a_{2,1} & \cdots & a_{1,l} & \cdots & a_{1,L} \\ a_{2,1} & a_{2,2} & & & & \\ \vdots & & \ddots & & & \\ a_{k,1} & & & \ddots & & \\ \vdots & & & & \ddots & \\ a_{K,1} & & & & & a_{K,L} \end{bmatrix},$$

where

K indicates a quantity of precoding ports; L indicates a quantity of precoding data streams; $\alpha_{K,L}$ indicates precoding of a $K^{th}$ port in an $L^{th}$ data stream; and each row of $A_{K,L}$ has at most one non-zero element. Optionally, each column has at least one non-zero element.

In an optional manner, when the precoding codebook is the frequency domain codebook, the non-zero element $\alpha_{K,L}$ in the precoding codebook is $\lambda_K \cdot e^{(1j*\phi_{K,L}(n))}$; $\lambda_K$ indicates an amplitude and a common phase value of precoding of the port K; and $\phi_{K,L}(n)$ indicates a phase value of mapping the $L^{th}$ data stream to the $K^{th}$ port on an $n^{th}$ frequency domain resource.

In an optional manner, when the precoding codebook is the delay domain codebook, the non-zero element $\alpha_{K,L}$ in the precoding codebook is $\varpi_K \cdot \delta(t-\tau_{K,L})$; $\varpi_K$ indicates an amplitude and a phase value of precoding of the port K; $\delta(t-\tau_{K,L})$ is an impulse function; and $\tau_{K,L}$ indicates a delay shift value of mapping the $L^{th}$ data stream to the $K^{th}$ port.

In an optional manner, the transceiver unit is further configured to:

receive reporting configuration information, where
the reporting configuration information includes one or more of the following: the correspondence that is between the precoding port and the precoding data stream and that is selected by the sending apparatus, the codebook selected by the sending apparatus, the power of the precoding data stream, and the power of the precoding port. The precoding information is transmitted based on the reporting configuration information.

In an optional manner, there are a plurality of correspondences between the precoding port and the precoding data stream. The processing unit is further configured to select one of the plurality of correspondences between the precoding port and the precoding data stream.

In an optional manner, the power of the data stream includes one or more of the following: an inter-stream power coefficient or an inter-stream power difference. The inter-stream power coefficient indicates a power difference value that is between two data streams and that is reported by the sending apparatus. The inter-stream power difference indicates a power difference value that is between M data streams and that is reported by the sending apparatus. M is greater than 2.

In an optional manner, the power of the precoding port includes: a power control coefficient of the port when an inter-port power is not borrowed; or a power allocation proportion of the port when an inter-port power is borrowed.

In an optional manner, the transceiver unit is further configured to receive configuration information of the inter-port power, where the configuration information of the inter-port power indicates a borrowing status of the inter-port power. The processing unit reports the power of the precoding port based on the configuration information of the inter-port power.

According to a third aspect, this application provides a receiving apparatus including a transceiver unit and a processing unit.

The transceiver unit is configured to receive precoding information, where the precoding information includes one or more of the following: a precoding codebook, a power of a precoding port, a power of a precoding data stream, or a correspondence between the precoding port and the precoding data stream, where one or more precoding ports may correspond to one precoding data stream. The processing unit is configured to transmit data with reference to the precoding information.

In an optional manner, the precoding codebook includes one of the following: a frequency domain codebook, a time domain codebook, or a delay domain codebook.

The frequency domain codebook is a codebook in which the amplitudes of subcarriers are the same and a phase difference between the subcarriers is constant within a preset frequency band range.

In an optional manner, the precoding codebook is as follows:

$$A_{K,L} = \begin{bmatrix} a_{1,1} & a_{2,1} & \cdots & a_{1,l} & \cdots & a_{1,L} \\ a_{2,1} & a_{2,2} & & & & \\ \vdots & & \ddots & & & \\ a_{k,1} & & & \ddots & & \\ \vdots & & & & \ddots & \\ a_{K,1} & & & & & a_{K,L} \end{bmatrix},$$

where

K indicates a quantity of precoding ports; L indicates a quantity of precoding data streams; $\alpha_{K,L}$ indicates precoding of a $K^{th}$ port in an $L^{th}$ data stream; and each row of $A_{K,L}$ has at most one non-zero element. Optionally, each column has at least one non-zero element.

In an optional manner, when the precoding codebook is the frequency domain codebook, the non-zero element $\alpha_{K,L}$ in the precoding codebook is $\lambda_K \cdot e^{(1j*\phi_{K,L}(n))}$; $\lambda_K$ indicates an amplitude and a common phase value of precoding of the port K; and $\phi_{K,L}(n)$ indicates a phase value of mapping the $L^{th}$ data stream to the $K^{th}$ port on an $n^{th}$ frequency domain resource.

In an optional manner, when the precoding codebook is the delay domain codebook, the non-zero element $\alpha_{K,L}$ in the precoding codebook is $\varpi_K \cdot \delta(t-\tau_{K,L})$; $\varpi_K$ indicates an amplitude and a phase value of precoding of the port K; $\delta(t-\tau_{K,L})$ is an impulse function; and $\tau_{K,L}$ indicates a delay shift value of mapping the $L^{th}$ data stream to the $K^{th}$ port.

In an optional manner, the transceiver unit is further configured to transmit reporting configuration information, where the reporting configuration information includes one or more of the following: the correspondence that is between the precoding port and the precoding data stream and that is selected by the sending apparatus, the codebook selected by the sending apparatus, the power of the precoding data stream, and the power of the precoding port.

For the second aspect or the third aspect, it should be understood that the transceiver unit may be referred to as an input/output unit, a communication unit, or the like. When the communication apparatus is a terminal device, the transceiver unit may be a transceiver. In addition, the transceiver may include a receiver and a transmitter. The receiver is configured to receive data, and the transmitter is configured to send data. The processing unit may be a processor. When the communication apparatus is a module (for example, a chip) in a terminal device, the transceiver unit may be an input/output interface, an input/output circuit, an input/output pin, or the like, or may be referred to as an interface, a communication interface, an interface circuit, or the like. In addition, the transceiver unit may include the input interface and the output interface. The input interface is configured to receive data, and the output interface is configured to send data. The processing unit may be a processor, a processing circuit, a logic circuit, or the like.

According to a fourth aspect, this application provides a communication apparatus, including at least one processor. The at least one processor is configured to execute a computer program or instructions in a memory, so that the communication apparatus performs the method according to the first aspect or the embodiments of the first aspect.

According to a fifth aspect, this application provides a communication apparatus, including a processor, a transceiver, and a memory. The processor is configured to execute a computer program or instructions in the memory, so that the communication apparatus performs the method according to the first aspect or the embodiments of the first aspect.

According to a sixth aspect, this application provides another communication apparatus, including an interface circuit and a logic circuit. The interface circuit may be understood as an input/output interface. The logic circuit may be configured to execute code instructions to perform the method according to the first aspect or the embodiments of the first aspect.

According to a seventh aspect, this application further provides a computer-readable storage medium. The computer-readable storage medium stores computer-readable instructions. When the computer-readable instructions are run on a computer, the computer is enabled to perform the method according to any one of the first aspect or the possible designs of the first aspect.

According to an eighth aspect, this application provides a computer program product including instructions. When the computer program product runs on a computer, the computer is enabled to perform the method according to the first aspect or the embodiments of the first aspect.

According to a ninth aspect, this application provides a chip system. The chip system includes a processor, and may further include a memory, configured to implement the method according to any one of the first aspect or the possible designs of the first aspect. The chip system may include a chip, or may include a chip and another discrete component.

According to a tenth aspect, this application provides a communication system. The system includes a sending apparatus and a receiving apparatus. The communication system is configured to perform the method according to any one of the first aspect or the possible designs of the first aspect.

For technical effects that can be achieved in the second aspect to the tenth aspect, refer to descriptions of technical effects that can be achieved in corresponding possible design solutions in the first aspect. Details are not described herein again in this application.

BRIEF DESCRIPTION OF DRAWINGS

FIG. 4 is a schematic diagram of frequency domain precoding according to an embodiment of this application;

FIG. 5 is a schematic diagram of a time domain cyclic shift according to an embodiment of this application;

FIG. 6 is a schematic diagram of a time domain non-cyclic shift according to an embodiment of this application;

FIG. 7 is a schematic diagram of a structure of a communication apparatus according to an embodiment of this application;

DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise specified, "a plurality of" means two or more than two. Therefore, for implementations of an apparatus and a method, refer to each other, and repeated parts are not described.

This application may be applied to a $5^{th}$ generation (5G) mobile communication technology new radio (NR) system, or may be applied to another communication system, for example, a next generation communication system. The following describes a communication system applicable to this application. A sending apparatus in the communication system may be a terminal device, and a receiving apparatus may be a network device. This is not specifically limited in this application in actual applications. The following describes, with reference to FIG. 1A and FIG. 1B by using an example in which the sending apparatus is the terminal device and the receiving apparatus is the network device, a communication system to which this application may be applicable.

Figure 1A:
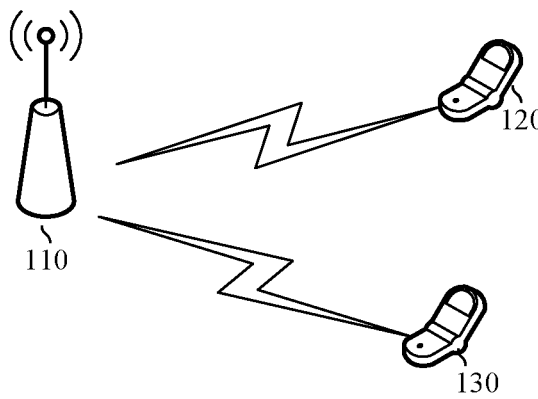
FIG. 1A is a schematic diagram of a communication system according to an embodiment of this application.

FIG. 1A shows a communication system 100 applicable to this application. The communication system 100 includes a network device 110, a terminal device 120, and a terminal device 130. That the network device 110 sending data to the terminal device 120 or the terminal device 130 may be understood as downlink data transmission. FIG. 1A illustrates the communication system for downlink communication.

Figure 1B:
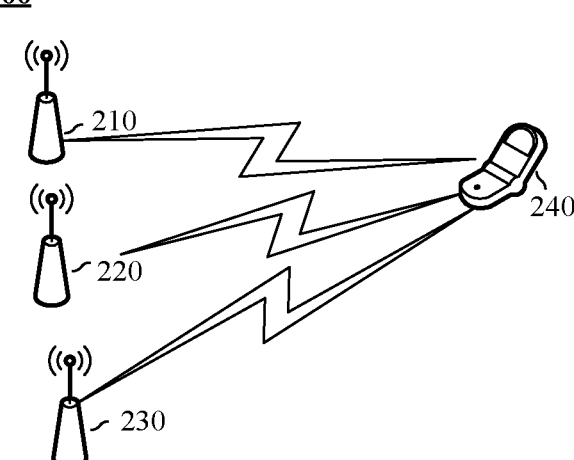
FIG. 1B is a schematic diagram of a communication system according to an embodiment of this application.

FIG. 1B shows another communication system 200 applicable to this application. The communication system 200 includes a network device 210, a network device 220, a network device 230, and a terminal device 240. The terminal device 240 sending data to the network device 210 may be understood as uplink data transmission. FIG. 1B illustrates the communication system for uplink communication.

A precoding processing method provided in this application may be applicable to both the communication system for downlink communication shown in FIG. 1A and the communication system for uplink communication shown in FIG. 1B. This is not specifically limited in this application. The network device is an apparatus that is deployed in a radio access network to provide a wireless communication function for the terminal device. An access network device is a device that has a wireless transceiver function or a chip that may be disposed in the device. The device includes but is not limited to: an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), an access point (AP) in a wireless fidelity (Wi-Fi) system, a wireless relay node, a wireless backhaul node, a transmission point (TRP) or transmission point (TP), or the like, may be a gNB or a transmission point (TRP or TP) in a 5G (for example, an NR) system, or one or a group (including a plurality of antenna panels) of antenna panels of a base station in the 5G system, or may be a network node that forms the gNB or the transmission point, for example, a baseband unit (BBU), a distributed unit (DU), a satellite, or an uncrewed aerial vehicle.

In some deployments, the gNB may include a central unit (CU) and the DU. The gNB may further include a radio frequency unit (RFU). The CU implements some functions of the gNB, and the DU implements some functions of the gNB. For example, the CU implements functions of a radio resource control (RRC) layer and a packet data convergence protocol (PDCP) layer. The DU implements functions of a radio link control (RLC) layer, a media access control (MAC) layer, and a physical (PHY) layer. Information at the RRC layer eventually becomes information at the PHY layer (that is, sent by using the PHY layer), or is converted from the information at the PHY layer. Therefore, in this architecture, higher layer signaling, for example, RRC layer signaling or PDCP layer signaling, may also be considered to be sent by the DU, or sent by the DU and the RFU. It may be understood that the access network device may be a CU node, a DU node, or a device including the CU node and the DU node. In addition, the CU may be divided into a network device in the radio access network (RAN), or the CU may be divided into a network device in a core network CN. This is not limited herein.

The terminal device in embodiments of this application may also be referred to as a terminal. A terminal device is an entity on a user side configured to receive or transmit a signal, and is configured to send an uplink signal to the network device, or receive a downlink signal from the network device. The terminal device includes a device that provides a user with voice and/or data connectivity, for example, and may include a handheld device having a wireless connection function, or a processing device connected to a wireless modem. The terminal device may communicate with the core network through the RAN, and exchange a voice and/or data with the RAN. The terminal device may include UE, a vehicle-to-X (V2X) terminal device, a wireless terminal device, a mobile terminal device, a device-to-device (D2D) communication terminal device, a machine-to-machine/machine-type communication (M2M/MTC) terminal device, an internet of things (IOT) terminal device, a subscriber unit, a subscriber station, a mobile station, a remote station, an access point (AP), a remote terminal, an access terminal, a user terminal, a user agent, a user device, a wearable device, a vehicle-mounted device, an uncrewed aerial vehicle, or the like.

By way of example but not limitation, in embodiments of this application, the terminal device may alternatively be a wearable device. A wearable device may also be referred to as a wearable intelligent device, an intelligent wearable device, or the like, and is a general term of wearable devices, for example, glasses, gloves, watches, clothes, and shoes, that are intelligently designed and developed for daily wear by using a wearable technology. A wearable device is a portable device that is directly worn on a body or integrated into clothes or an accessory of a user. A wearable device is not only a hardware device, but also implements a powerful function through software support, data exchange, and cloud interaction. In a broad sense, wearable intelligent devices include full-featured and large-sized devices that can implement all or some of functions without depending on smartphones, for example, smart watches or smart glasses, and include devices that focus only on one type of application function and need to collaboratively work with other devices such as the smartphones, for example, various smart bands, smart helmets, or smart jewelry for monitoring physical signs.

If the various terminal devices described above are located in a vehicle (for example, placed in a vehicle or installed in a vehicle), the terminal devices may be considered as vehicle-mounted terminal devices. A vehicle-mounted terminal device may also be referred to as an on-board unit (OBU).

As described in the background, compared with OFDM transmission, single-carrier transmission has an advantage of having a low PAPR. Compared with a waveform used in an OFDM transmission, a single-carrier waveform has a disadvantage of low capacity, that is, a capacity of the single-carrier waveform is not as good as a capacity of OFDM. In addition, an OFDM waveform can easily support user frequency division. However, as a frequency band further expands, a process limitation of a component is more obvious. Consequently, even if OFDM transmission is used on a base station side, some trade-offs (increased back-off and degraded coverage) still needs to be made. Therefore, using single-carrier transmission on a higher frequency band becomes a trend. Discrete Fourier transform spread OFDM (discrete Fourier Transform spread orthogonal frequency division multiplexing, DFT-s-OFDM) used in long term evolution (LTE) and NR in the conventional technology is extended to a plurality of streams. After coherent precoding is performed, PAPR may deteriorate. Further, both codebooks in the LTE and the NR are designed based on uplink transmission. During uplink transmission, the quantity of ports of a terminal is small, and the precoding design is simple. However, if a downlink single carrier is used for downlink transmission, the quantity of ports of a base station is large, and a current codebook design cannot meet a downlink data transmission requirement. In view of this, a precoding processing method is urgently needed to resolve the foregoing problem.

Figure 2:
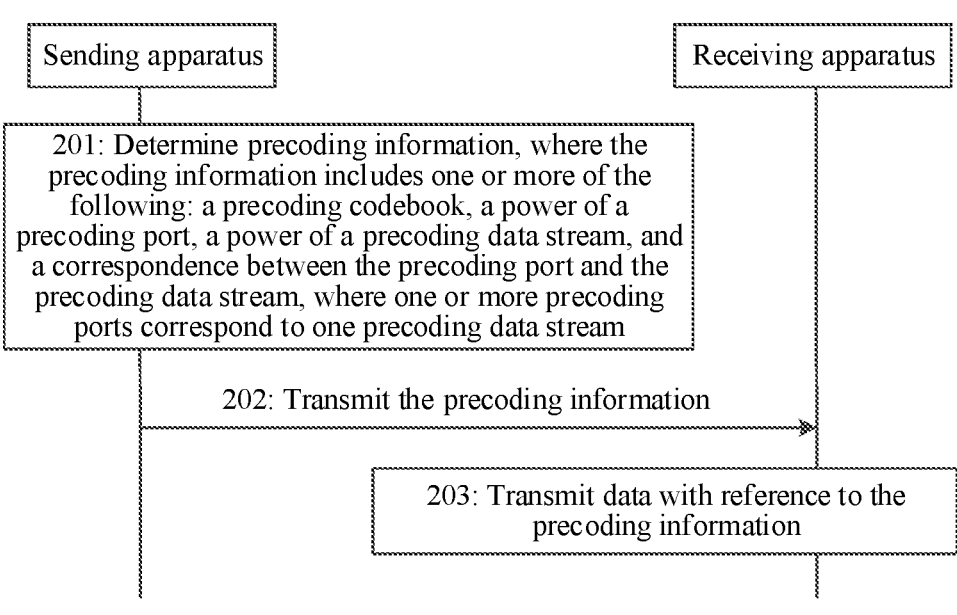
FIG. 2 is a schematic flowchart of a precoding processing method according to an embodiment of this application.

This application provides a precoding processing method. The method may be implemented through interaction between a receiving apparatus and a sending apparatus, or may be implemented by the receiving apparatus or the sending apparatus. The receiving apparatus may be understood as a network device, for example, a TRP or a gNB, or may be understood as a module (for example, a chip) in the network device. The sending apparatus may be understood as a terminal device, for example, UE or a vehicle-mounted device, or may be understood as a module (for example, a chip) in the terminal device. This is not specifically limited in this application. Downlink data transmission is used as an example. Refer to FIG. 2. The following steps are performed.

201: The sending apparatus determines precoding information, where the precoding information may include one or more of the following: a precoding codebook, a power of a precoding port, a power of a precoding data stream, or a correspondence between the precoding port and the precoding data stream. One or more precoding ports may correspond to one precoding data stream.

It should be noted that the sending apparatus may obtain a channel measurement result by measuring a reference signal from the receiving apparatus, and determine the precoding information based on the measurement result. Alternatively, the sending apparatus may obtain the precoding information by interacting with another sending apparatus. For example, both UE 1 and UE 2 exchange data with a gNB 1, and the UE 1 and the UE 2 separately determine the precoding information. Precoding information used for transmission of two users may be determined on a base station side based on the precoding information reported by the UE 1 and the UE 2. This is not specifically limited herein in this application.

The precoding codebook is a codebook when the sending apparatus advises the receiving apparatus to perform downlink data transmission, or a codebook when the receiving apparatus advises the sending apparatus to perform uplink data transmission. This is not specifically limited herein in this application. Based on a protocol agreement or a configuration of the receiving apparatus, the sending apparatus determines a fixed optional codebook set when a quantity of ports of the receiving apparatus is given. The configuration of the receiving apparatus is used as an example. For the given quantity of ports, the receiving apparatus may configure P codebook sets based on codebook configuration information. The P codebook sets include different codebooks with different quantities of streams. To ensure that PAPR is not adversely impacted, each port in each codebook set sends data of only one stream. After the receiving apparatus configures the codebook set, each codebook in the set has corresponding index information (for example, a codebook index configured by the receiving apparatus), and the terminal selects a corresponding index for reporting. For example, the network device configures three codebook sets. A codebook A is a codebook corresponding to two data streams, a codebook B is a codebook corresponding to three data streams, and a codebook C is a codebook corresponding to four data streams. The terminal device may directly report C, in other words, select the codebook C. In addition, if the sending apparatus reports a quantity of streams, a quantity of streams in the codebook information corresponds to the reported quantity of streams. In other words, if the quantity of data streams in the precoding codebook reported by the terminal device is 2, the codebook information can only include the codebook corresponding to two data streams.

The power of the precoding data stream may be an inter-stream power coefficient and an inter-stream power difference. The inter-stream power coefficient indicates a power difference value that is between two data streams and that is reported by the sending apparatus. For example, a codebook reported by the terminal device indicates that a quantity of data streams for downlink channel transmission advised by the terminal device is 2. The terminal device may additionally report a coefficient a, and it indicates that a power difference between two streams measured by the terminal device is a dB, where the coefficient a may be a quantized value specified in a protocol. For example, it is specified in the protocol that a bit 00 is 0 dB (where powers of the two streams are the same), a bit 01 is 2 dB (where a power of one stream is 2 dB greater than a power of the other stream), a bit 10 is 3 dB, and a bit 11 is 6 dB. When feeding back the inter-stream power coefficient, the terminal device may directly feedback the power difference between the two streams, or may feedback the quantized value. This is merely an example for description and is not specifically limited herein. The inter-stream power difference indicates a power difference value that is between M data streams and that is reported by the sending apparatus. M is greater than 2. When the quantity of streams is greater than 2, the sending apparatus may report a power difference between neighboring streams, or may report a power difference between another stream and a first stream. For example, when the quantity of streams reported by the terminal device is 3, for the inter-stream power difference, a power difference between the $0^{th}$ stream and the $1^{st}$ stream and a power difference between the $0^{th}$ stream and the $2^{nd}$ stream may be reported. Alternatively, a power difference between the $0^{th}$ data stream and the $1^{st}$ data stream and a power difference between the $1^{st}$ data stream and the $2^{nd}$ data stream may be reported. A specific type of the power of the precoding data stream to be selected for reporting may be pre-agreed on by the network device or in the protocol.

The power of the precoding port in different cases are discussed. When an inter-port power can be borrowed, a power allocation proportion of the port needs to be reported. When an inter-port power cannot be borrowed, a power control coefficient of the port needs to be reported. Whether the inter-port power can be borrowed is determined by the sending apparatus by receiving configuration information of the inter-port power, where the configuration information of the inter-port power indicates a borrowing status of the inter-port power. The power of the precoding port is reported based on the configuration information of the inter-port power. When the inter-port power cannot be borrowed, if the network device configures reporting of information about a power of a port, a power control coefficient of each port may be additionally fed back in the precoding information reported by the terminal device. The power control coefficient may be an amplitude, a power, or a quantized value. A quantization manner may be pre-agreed on in the protocol or a network configuration. For example, it is agreed on in the protocol that the bit 00 is 0 dB (where powers of the two ports are the same), the bit 01 is 2 dB (where a power of one port is 2 dB greater than a power of the other port), the bit 10 is 3 dB, and the bit 11 is 6 dB. This is not specifically limited herein.

When the inter-port power can be borrowed, the network device or the protocol needs to notify the terminal device of specific borrowing information of a power of a port by using a configuration or the protocol. For example, all ports of a base station can borrow power. For ports of the base station, N consecutive ports are divided into one group, the power can be borrowed within the group, and the like. The terminal device may report a coefficient of the power of the port based on an allocation status of the inter-port power. Four ports are used as an example. It is assumed that the protocol or the base station notifies, by using configuration information, that for the four ports of the terminal device, powers can be borrowed separately between the first two ports and between the last two ports. Information reported by the terminal may be:

for a port 1: a power allocation proportion of the port 1; and for a port 3: a power allocation proportion of the port 3.

In this case, the network device may determine a power proportion of a port 2 and a power proportion of a port 4 based on the power proportion of the port 1 and the power proportion of the port 3. A quantization manner of a power proportion may be indicated by using a linear value 0.3 (where to be specific, it indicates to take account of 30% of powers in the group) or a dB value, that is, relative to −X dB of a power of a port in the group, or to two ports, X dB greater or less than the other remaining port, and the like. This is not specifically limited herein in this application.

In addition, the terminal device may advise the network device to disable one or more ports, for energy saving of the base station and energy saving of the terminal. After the network device disables the port, sending energy consumption of the network device is reduced. The terminal device receiving less port data also helps simplify a signal processing operation of the terminal device. The port disabling advice may be implemented by using a mechanism of reporting a power of a port, or may be implemented in a codebook in which a signal of any stream is not sent through the port.

There are a plurality of correspondences between the precoding port and the precoding data stream. The sending apparatus may select one of the plurality of correspondences between the precoding port and the precoding data stream. To ensure a low PAPR during data transmission, one or more precoding ports may correspond to one data stream. The correspondence between the precoding port and the precoding data stream may be agreed upon in the protocol, or may be directly indicated by using configuration information of the network device, or may be obtained by using precoding information of another terminal device. A manner of determining the correspondence between the precoding port and the precoding data stream is not specifically limited herein in this application. The correspondence between the precoding port and the precoding data stream may be determined in the following manners.

Manner 1: One codebook set may be defined in the protocol. Because a codebook may indicate a mapping between a quantity of streams and a port, selecting a corresponding codebook by the terminal is equivalent to determining the correspondence between the precoding port and the precoding data stream.

Manner 2: For a given data stream and a given port, one or more correspondences between the data stream and the port are directly agreed on in the protocol or by the network device. When a plurality of correspondences are defined in the protocol or by the base station, the terminal selects one of the correspondences and reports the selected correspondence. For example, it is assumed that a quantity of ports is 6, and a quantity of data streams is 2. The network device may configure two correspondences: [3, 3] and [4, 2]. [3, 3] indicates that the $1^{st}$ data stream corresponds to three ports, and the $2^{nd}$ data stream corresponds to three ports. [4, 2] indicates that the $1^{st}$ data stream corresponds to four ports, and the $2^{nd}$ data stream corresponds to two ports. The network device may configure indexes of the two different correspondences. The terminal device reports an index value, so that the network device can be enabled to determine a correspondence selected by the terminal device.

Manner 3: The terminal device selects a correspondence between a port and a stream, and reports the correspondence to the network device. For example, the terminal may report a correspondence between consecutive ports and data streams. It is assumed that a quantity of ports is 6, and a quantity of data streams is 2. The terminal may report a port index 3, and it indicates that the $2^{nd}$ stream starts from the $3^{rd}$ port and corresponds to ports [3, 4, 5], and the $1^{st}$ stream corresponds to ports [0, 1, 2]. This is merely an example for description and is not specifically limited herein.

Manner 4: A reserved correspondence of the port may be inconsecutive, and inconsecutive port numbers may be represented by using a bit string. For example, the base station may provide two correspondences: [0, 1, 0, 1, 0, 1] and [0, 0, 0, 1, 1, 1], which respectively indicate that ports [0, 2, 4] correspond to the $1^{st}$ data stream and the other ports correspond to the $2^{nd}$ data stream, and ports [0, 1, 2] correspond to the $1^{st}$ data stream and the other ports correspond to the $2^{nd}$ data stream. Alternatively, the terminal device determines a correspondence between inconsecutive ports and inconsecutive data streams.

The foregoing port index may be a relative index in a resource. For example, port indexes 0 to 7 reported by using CSI corresponding to an eight-port CSI-RS may indicate indexes obtained by sorting eight ports corresponding to the CSI-RS in an ascending order of port numbers. In addition, the port index may be replaced with an absolute port number. It is assumed that the port numbers of the eight ports corresponding to the CSI-RS are 3000+P, where P=0 to 7. The ports may be further grouped, and the like. Based on the data streams corresponding to the grouped ports, a correspondence between the ports and the data streams is determined. This is not specifically limited in this application.

202: The sending apparatus transmits the precoding information to the receiving apparatus.

203: The receiving apparatus transmits data with reference to the precoding information.

It should be noted that because the receiving apparatus may receive precoding information from a plurality of sending apparatuses, and the plurality of sending apparatuses need to perform simultaneous transmission, directly sending downlink data based on one piece of precoding information causes poor receiving performance of another terminal. After data processing is performed (where for example, a codebook with a minimum relative loss is calculated based on the codebooks fed back by a plurality of communication apparatuses, and then a plurality of users use the codebook for transmission), a downlink data transmission status is determined with reference to a plurality of pieces of precoding information. This can ensure low PAPR and can adapt to a requirement of more sending apparatuses.

Figure 3:
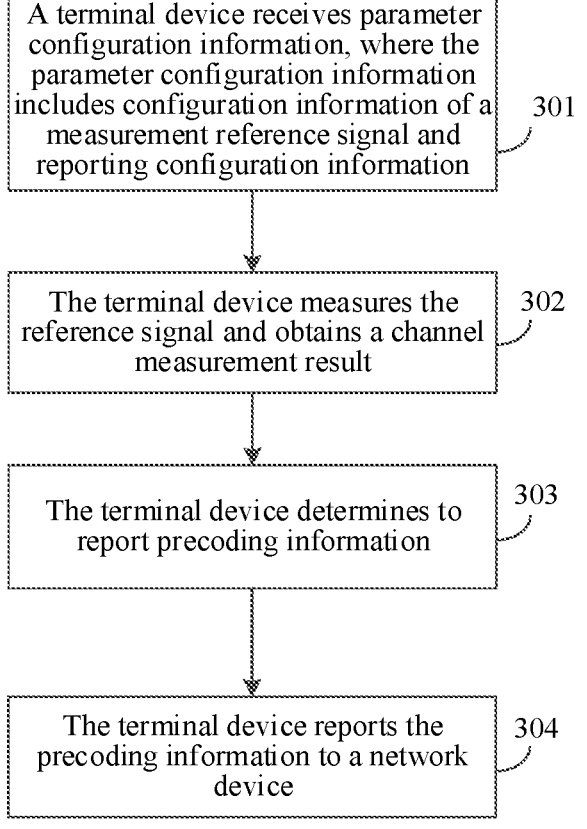
FIG. 3 is a schematic flowchart of a precoding processing method according to an embodiment of this application.

In an optional manner, before determining the precoding information, the sending apparatus may further receive parameter configuration information, where the parameter configuration information may include reporting configuration information, and the reporting configuration information includes one or more of the following: the correspondence that is between the precoding port and the precoding data stream and that is selected by the sending apparatus, the codebook selected by the sending apparatus, the power of the precoding data stream, and the power of the precoding port. The sending apparatus transmits the precoding information based on the reporting configuration information. In addition, the parameter configuration information may further include configuration information of a measurement reference signal, and the configuration information of the measurement reference signal includes a measurement periodicity and a quantity of reference signal ports. The reporting configuration information may further include a reporting parameter (one or more of a precoding matrix indicator (PMI), a rank indicator (RI), and a channel quality indicator (CQI)), a reporting periodicity, and the like. This is not specifically limited herein in this application. Refer to FIG. 3. The following steps are performed.

301: A terminal device receives parameter configuration information, where the parameter configuration information includes configuration information of a measurement reference signal and reporting configuration information.

302: The terminal device measures the reference signal and obtains a channel measurement result.

303: The terminal device determines to report precoding information.

304: The terminal device reports the precoding information to a network device.

In this application, the terminal device feeds back more types of precoding information, so that the network device obtains more reference information when transmitting downlink data. In addition, one or more precoding ports correspond to one precoding data stream, so that the feature of a low PAPR of a precoding codebook can be ensured. When a precoding codebook fed back by the terminal device has a low PAPR, the network device can ensure low PAPR during downlink data transmission as much as possible.

In an optional manner, the precoding codebook is as follows:

$$A_{K,L} = \begin{bmatrix} a_{1,1} & a_{2,1} & \cdots & a_{1,l} & \cdots & a_{1,L} \\ a_{2,1} & a_{2,2} & & & & \\ \vdots & & \ddots & & & \\ a_{k,1} & & & \ddots & & \\ \vdots & & & & \ddots & \\ a_{K,1} & & & & & a_{K,L} \end{bmatrix},$$

where

K indicates a quantity of precoding ports; L indicates a quantity of precoding data streams; $\alpha_{K,L}$ indicates precoding of a $K^{th}$ port in an $L^{th}$ data stream; and each row of $A_{K,L}$ has at most one non-zero element. In addition, each column may have at least one non-zero element. The foregoing constraint ensures that at most one data stream is sent on a same port. Different streams do not overlap on a same port, and a PAPR is not damaged.

The precoding codebook may include one of the following: a frequency domain codebook, a time domain codebook, and a delay domain codebook. In this application, during application, the time domain codebook may multiply each port at a transmit end by a precoding coefficient in time domain. During application, the delay domain codebook may perform a delay operation on a time domain signal of each port based on the time domain codebook and then send the time domain signal.

The foregoing codebook matrix may be used for a frequency domain unit of the frequency domain codebook, or may be used for the time domain codebook (where each data stream is mapped to a corresponding port after being multiplied by a corresponding precoding value). $X_L$ represents time domain data corresponding to L data streams. The time domain data is mapped to K ports after $A_{K,L}$ matrix precoding. A signal obtained through precoding on a $k^{th}$ port may be written as $y_k(n) = \Sigma_{l=1 \ to \ L} x_l(n)^* a_{k,l}(n)$.

For a delay domain, the signal obtained through precoding on the $k^{th}$ port may be written as: $y_k(n) = \Sigma_{l=1 \ to \ L} x_l(n) \circ a_{k,l}(n)$, where $\circ$ may represent circular convolution or non-circular convolution, and may be determined based on an actual application. It should be noted that, convolution and multiplication are equivalent, that is, $x_l(n) \circ a_{k,l}(n)$ is equivalent to $x_l(n)^* a_{k,l}(n)$. In this case, delay domain precoding is the same as time domain precoding. In other words, when a delay is 0, delay domain precoding is the same as time domain precoding.

During actual application, a sending apparatus may choose to feed back a corresponding codebook based on a service requirement. A receiving apparatus may also perform data processing based on the codebook fed back by the sending apparatus, and determine a codebook that is to be selected for data transmission. The frequency domain codebook is a codebook in which amplitudes of subcarriers are the same and a phase difference between the subcarriers is constant within a preset frequency band range. As shown in FIG. 4, precoding data is obtained by multiplying frequency domain data of a port X by frequency domain precoding. An amplitude of the frequency domain precoding is constant and unchanged, and the phase difference between the subcarriers is constant and phenomenologically changed.

The frequency domain codebook may be as follows:

$$\begin{bmatrix} \lambda_0 \cdot e^{(1j*\phi_{1,1}(n))} & \cdots & \cdots & \\ \lambda_1 \cdot e^{(1j*\phi_{2,1}(n))} & & & \\ \vdots & \ddots & & \\ & & \ddots & \\ \vdots & & & \ddots & \lambda_{k-1} \cdot e^{(1j*\phi_{k-1,1}(n))} \\ & & & & \lambda_K \cdot e^{(1j*\phi_{K,L}(n))} \end{bmatrix},$$

where $\lambda_K$ indicates an amplitude and a common phase value of precoding of the port K. It is noted that quantization feedback may be separately performed on the amplitude and phase $\lambda_K$, or the amplitude and phase may be reported through quantization feedback together. Both the amplitude and the phase may be reported through quantization feedback, only the amplitude may be quantized (where the phase is 0 by default, or follows a common phase of a full frequency band), or only the phase may be quantized (where the amplitude is a preset value, for example, 1, or follows a common amplitude). $\phi_{K,L}(n)$ indicates a phase value of the $L^{th}$ data stream of the $K^{th}$ port on an $n^{th}$ frequency domain resource. The $n^{th}$ frequency domain resource may be a subcarrier, may be a set of subcarriers, for example, an RB, or may be 1/N_oversampling of the subcarrier. 1/N_oversampling indicates an oversampling multiple of frequency domain fast Fourier transform (FFT). In addition, to ensure that a PAPR is not damaged, a phase difference of adjacent frequency domain resources of a same port is requested to be a fixed value within a bandwidth range. $\phi_{k,l}(n+1) - \phi_{k,l}(n) = Q + x*2\pi$, where Q is a real constant, and x is an integer.

When the frequency domain codebook is defined, for each port, the terminal device needs to feed back a phase difference (accurately, a quantized value of the phase difference) advised by the terminal device in frequency domain. The phase difference is fed back based on each port. For example, $\phi_{k,l}(n+1) - \phi_{k,l}(n)$ or $\phi_{k,l}(n) - \phi_{k,l}(n-1)$ may be quantized. The foregoing phase difference is merely an example. The terminal device may be requested to report a phase difference of adjacent frequency domain resources (previous-next), may be a phase difference of adjacent frequency domain resources (next-previous), or may even be a phase difference at intervals of Z frequency domain units. Z is a pre-configured value, or may be a value reported by the terminal device. For example, if the terminal device reports Z=2, it indicates that the terminal device feeds back a phase difference at intervals of two frequency domain resource units. This flexible interval can reduce quantization overheads.

Optionally, a port may serve as a reference. By default, a phase of each frequency domain unit of the port is the same, and the port does not need to feed back a phase difference. This can reduce overheads. Another port of the same phase feeds back a cyclic shift or a value relative to the port.

A definition manner (a linear phase between different frequency domains of a same port) of the frequency domain codebook may be equivalent to a cyclic shift in time domain. From a perspective of the time domain, only a cyclic shift occurs on a signal of the port, and a PAPR of the signal does not change. Therefore, a low PAPR is ensured.

In this application, the delay domain codebook may be as follows:

$$\begin{bmatrix} \varpi_0 \cdot \delta(t - \tau_{1,1}) & \cdots & \cdots & \\ \varpi_1 \cdot \delta(t - \tau_{2,1}) & & & \\ \vdots & \ddots & & \\ & & \ddots & \\ \vdots & & \ddots & \varpi_{k-1} \cdot \delta(t - \tau_{k-1,l}) \\ & & & \varpi_K \cdot \delta(t - \tau_{K,L}) \end{bmatrix},$$

where $\varpi_K$ indicates an amplitude and a phase value of precoding of the port K; $\delta(t-\tau_{K,L})$ is an impulse function; and $\tau_{K,L}$ indicates a delay shift value of mapping an $L^{th}$ data stream to a $K^{th}$ port.

The terminal device may circularly convolve data on a port and a codebook element of the port. A port 2 is used as an example. It is assumed that data on the port 2 is x2(t). x2(t)*$\lambda_0$·$\delta(t-\tau_{1,1})$, where (*) indicates circular convolution. For the terminal device, a value $\tau_{k,l}$ of a delay on each port needs to be fed back. A quantization method may be performing quantization by using a fractional multiple of a cyclic prefix (CP). For example, the network device or the terminal device indicates a total quantity M of quantized states, the terminal device feeds back a quantized state m, and the delay may be represented as: m*Ts/M. According to another quantization method, a minimum quantization time unit may be set, for example, a*Tc, where a is a constant, and Tc=1/(480*1000*4096) sec, or a*Ts, where Ts=1/(NFFT*SCS). FIG. 5 is a schematic diagram of a delay domain cyclic shift. Time domain data is moved backward by three units, and the three removed units are supplemented to a front end of the time domain data. For a sequence x(n) whose length is N, a sequence y(n) obtained through a cyclic shift through which k is obtained is represented as a formula: y(n)=x([n+k]$_N$), where [ ]$_N$ indicates a modulo operation on N.

In addition, there is a non-cyclic shift in delay domain. As shown in FIG. 6, the non-cyclic shift essentially uses different sending delays for different ports. In a multi-point transmission scenario, a difference between delays for different transmission points to arrive at a terminal may be large, or may even be greater than a CP. Therefore, in a multi-point joint precoding scenario, different transmission points should use different transmission delays for transmission, to achieve a better precoding effect. A difference between the non-cyclic shift and the cyclic shift is that non-circular linear convolution is used between a signal of a port and a codebook of the port, and a delay of the port may be greater than a CP length.

Optionally, a non-cyclic shift time domain codebook may be specified based on a port group, in other words, one port group shares one time domain codebook. Division of the port group is pre-configured using signaling (for example, RRC or media access control control element (MAC CE)). This is not specifically limited herein.

In addition, a non-cyclic shift time domain codebook and a cyclic time domain codebook may simultaneously take effect. For example, in one port group, cyclic time domain precoding is used, and for different port groups, different port groups may have different non-cyclic time domain precoding.

For a delay quantization method, a non-cyclic delay and a cyclic delay may be the same. This is not specifically limited herein.

In addition, time domain and frequency domain in this application are mainly for a signal precoding operation, and are not used to refer to whether a signal is a time domain signal or a frequency domain signal. Time domain means that a convolution operation is performed on the signal in precoding before the signal is sent. The frequency domain means that a multiplicative operation is performed on the signal in precoding based on a frequency domain unit, for example, a subcarrier. For different single-carrier waveforms, definitions of a frequency domain position and a time domain position are different, and corresponding precoding operations are also different. A before precoding signal enters an antenna port (where there is no discrete Fourier transform (DFT) after precoding, or there is an even quantity of times of DFT, and quantities of DFT transform points may be different), a time domain coding manner may be used. However, if DFT is further performed on a precoded signal for an odd quantity of times before the signal is transmitted, a frequency domain precoding manner should be used. For example, for DFT-s-OFDM, before pre-fast Fourier transform (FFT) at a transmit end (where transmit end inverse fast Fourier transform (IFFT) is performed at the transmit end again after the pre-FFT) and before transmission, time domain should be used, and post-FFT should use the frequency domain (where transmit end IFFT is performed at the transmit end again after the pre-FFT). For SC-quadrature amplitude modulation (QAM), because there is no DFT at the transmit end, a time domain manner may be used.

This application further provides a communication apparatus. As shown in FIG. 7, the communication apparatus includes a processing unit 71 and a transceiver unit 72. The communication apparatus may be the foregoing sending apparatus, or may be the foregoing receiving apparatus. This is not specifically limited in this application. "Unit" here may refer to a hardware component, for example, comprising one or more processing circuits or circuits or chips, data storage medium and/or input/output ports/interfaces, or software, or a combination of software and hardware. It should be understood that the transceiver unit may be referred to as an input/output unit, a communication unit, or the like. The transceiver unit may include a sending unit and a receiving unit. The sending unit and the receiving unit respectively implement a sending operation and a receiving operation in the method embodiments. When the communication apparatus is a terminal device, the transceiver unit may be a transceiver. In addition, the transceiver may include a receiver and a transmitter. The receiver is configured to receive data, and the transceiver is configured to send data. The processing unit may be a processor. When the communication apparatus is a module (for example, a chip) in a terminal device, the transceiver unit may be an input/output interface, an input/output circuit, an input/output pin, or the like, or may be referred to as an interface, a communication interface, an interface circuit, or the like. In addition, the transceiver unit may include the input interface and the output interface. The input interface is configured to receive data, and the output interface is configured to send data. The processing unit may be a processor, a processing circuit, a logic circuit, or the like.

When the communication apparatus is the sending apparatus, the processing unit 71 may be configured to determine precoding information, where the precoding information includes one or more of the following: a precoding codebook, a power of a precoding port, a power of a precoding data stream, and a correspondence between the precoding port and the precoding data stream, where one or more precoding ports correspond to one precoding data stream. The transceiver unit 72 is configured to transmit the precoding information.

When the communication apparatus is the receiving apparatus, the transceiver unit 72 is configured to receive precoding information, where the precoding information includes one or more of the following: a precoding codebook, a power of a precoding port, a power of a precoding data stream, or a correspondence between the precoding port and the precoding data stream. The precoding information indicates a mapping relationship between the precoding port and the precoding data stream. Each precoding port corresponds to one precoding data stream. The processing unit 71 is configured to transmit data with reference to the precoding information.

It should be noted that because the receiving apparatus may receive precoding information from a plurality of sending apparatuses, it is unreasonable to directly send downlink data based on one piece of precoding information thereof. After data processing is performed, a downlink data transmission status is determined with reference to a plurality of pieces of precoding information. This can ensure low PAPR and can accommodate a requirement of more sending apparatuses.

In this application, the terminal device feeds back more types of precoding information, so that the network device obtains more reference information when transmitting downlink data. In addition, each precoding port corresponds to one precoding data stream, so that the feature of low PAPR of the precoding codebook can be ensured. When the precoding codebook fed back by the terminal device has low PAPR, the network device can ensure low PAPR during downlink data transmission as much as possible.

In an optional manner, the precoding codebook includes one of the following: a frequency domain codebook, a time domain codebook, and a delay domain codebook.

The frequency domain codebook is a codebook in which amplitudes of subcarriers are the same and a phase difference between the subcarriers is constant within a preset frequency band range.

The frequency domain codebook is universal to a current multi-carrier precoding manner. The time domain codebook is defined more simply. In addition, all frequencies of an entire port are processed consistently. This is more applicable to a large-bandwidth scenario. Based on a time domain, the delay domain codebook introduces a precoding dimension of a delay, to better match delays between different ports and improve performance.

In an optional manner, the precoding codebook is as follows:

$$
A_{K,L} = \begin{bmatrix}
a_{1,1} & a_{2,1} & \cdots & a_{1,l} & \cdots & a_{1,L} \\
a_{2,1} & a_{2,2} & & & & \\
\vdots & & \ddots & & & \\
a_{k,1} & & & \ddots & & \\
\vdots & & & & \ddots & \\
a_{K,1} & & & & & a_{K,L}
\end{bmatrix},
$$

where

K indicates a quantity of precoding ports; L indicates a quantity of precoding data streams; $\alpha_{K,L}$ indicates precoding of a $K^{th}$ port in an $L^{th}$ data stream; and each row of $A_{K,L}$ has at most one non-zero element. Optionally, each column has at least one non-zero element. The foregoing constraint ensures that at most one data stream is sent on a same port. Different streams do not overlap on a same port, and a PAPR is not damaged.

In an optional manner, when the precoding codebook is the frequency domain codebook, the non-zero element $\alpha_{K,L}$ in the precoding codebook is $\lambda_K \cdot e^{(1j*\phi_{K,L}(n))}$; $\lambda_K$ indicates an amplitude and a common phase value of precoding of the port K; and $\phi_{K,L}(n)$ indicates a phase value of mapping the $L^{th}$ data stream to the $K^{th}$ port on an $n^{th}$ frequency domain resource.

In an optional manner, when the precoding codebook is the delay domain codebook, the non-zero element $\alpha_{K,L}$ in the precoding codebook is $\varpi_K \cdot \delta(t-\tau_{K,L})$; $\varpi_K$ indicates an amplitude and a phase value for precoding of the port K. It is noted that the amplitude and phase $\varpi_K$ may be respectively quantized and fed back, or may be quantized, fed back and reported together. Both the amplitude and the phase may be reported through quantization and feedback, only the amplitude may be quantized (where the phase is 0 by default, or follows a common phase of a full frequency band), or only the phase may be quantized (where the amplitude is a preset value, for example, 1, or follows a common amplitude); $\delta(t-\tau_{K,L})$ is an impulse function; and $\tau_{K,L}$ indicates a delay shift value of mapping an $L^{th}$ data stream to a $K^{th}$ port.

In an optional manner, the transceiver unit 72 is further configured to:

receive parameter configuration information, where the parameter configuration information includes reporting configuration information. Configuration information of a measurement reference signal includes a measurement periodicity and a quantity of reference signal ports. The reporting configuration information includes one or more of the following: the correspondence that is between the precoding port and the precoding data stream and that is selected by the sending apparatus, the codebook selected by the sending apparatus, the power of the precoding data stream, and the power of the precoding port. The transceiver unit 72 transmits the precoding information based on the reporting configuration information.

Reporting of information about a power of a port helps allocate the power of the port to another port with better transmission quality when a total power of the port is limited (due to regulations, a component capability, or the like), to improve precoding performance. When the quality of a plurality of streams of a channel differs greatly, an inter-stream power may balance a signal quality level of each stream, to maximize a multi-stream transmission gain.

In an optional manner, there are a plurality of correspondences between the precoding port and the precoding data stream. The processing unit is further configured to select one of the plurality of correspondences between the precoding port and the precoding data stream.

A plurality of correspondences between a port and a data stream are preconfigured by a base station. An advantage of doing so is that the correspondences may be configured as required based on an actual channel environment of each terminal. For example, the performance of a second stream differs greatly from the performance of a first stream, and more ports may be allocated to the second stream to implement inter-stream balance.

In an optional manner, the power of the data stream includes one or more of the following: an inter-stream power coefficient or an inter-stream power difference. The inter-stream power coefficient indicates a power difference value that is between two data streams and that is reported by the sending apparatus. The inter-stream power difference indicates a power difference value that is between M data streams and that is reported by the sending apparatus. M is greater than 2. When the quality of a plurality of streams of a channel differs greatly, an inter-stream power may balance a signal quality level of each stream, to maximize a multi-stream transmission gain.

In an optional manner, the power of the precoding port includes: a power control coefficient of the port when an inter-port power is not borrowed; or a power allocation proportion of the port when an inter-port power is borrowed. Reporting the information about the power of the port helps allocate the power of the port to the port with better quality for sending when the total power of the port is limited (due to the regulations, the component capability, or another constraint), to improve precoding performance.

In an optional manner, the transceiver unit 72 is further configured to receive configuration information of the inter-port power, where the configuration information of the inter-port power indicates a borrowing status of the inter-port power, to be specific, whether a power of one or more ports can be borrowed from each other. The transceiver unit 72 reports the power of the precoding port based on the configuration information of the inter-port power. Port borrowing information is configured, so that the terminal can determine whether a specific port can be enabled to provide an extra power for another port (or determine other ports) by sending less power.

Figure 8:
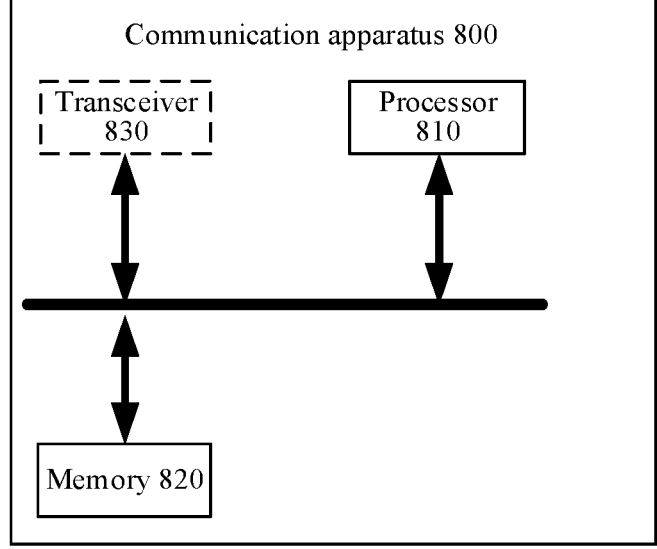
FIG. 8 is a schematic diagram of a structure of a communication apparatus according to an embodiment of this application.

In addition, as shown in FIG. 8, this application further provides a communication apparatus 800. For example, the communication apparatus 800 may be a chip or a chip system. Optionally, in some embodiments of this application, the chip system may include a chip, or may include a chip and another discrete device.

The communication apparatus 800 may include at least one processor 810. The communication apparatus 800 may further include at least one memory 820 that is configured to store a computer program, program instructions, and/or data. The memory 820 is coupled to the processor 810. Coupling in some embodiments of this application may be an indirect coupling or a communication connection between apparatuses, units, or modules in an electrical form, a mechanical form, or another form, and is used for information exchange between the apparatuses, the units, or the modules. The processor 810 may collaboratively operate with the memory 820. The processor 810 may execute the computer program stored in the memory 820. Optionally, the at least one memory 820 may also be integrated with the processor 810.

Optionally, in an actual application, the communication apparatus 800 may include or may not include a transceiver 830. A dotted box is used for illustration in the figures. The communication apparatus 800 may exchange information with another device by using the transceiver 830. The transceiver 830 may be a circuit, a bus, a transceiver, or any other apparatus that may be configured to exchange the information.

In a possible implementation, the communication apparatus 800 may be used in the foregoing terminal device, may be the foregoing sending apparatus, or may be the foregoing receiving apparatus. The memory 820 stores a necessary computer program, necessary program instructions, and/or necessary data for implementing a function of a relay device in any one of the foregoing embodiments. The processor 810 may execute the computer program stored in the memory 820, to complete the method in any one of the foregoing embodiments.

A specific connection medium between the transceiver 830, the processor 810, and the memory 820 is not limited in embodiments of this application. In some embodiments of this application, e.g., in FIG. 8, the memory 820, the processor 810, and the transceiver 830 are connected through the bus. The bus is represented by a bold line in FIG. 8. A connection manner between other components is merely described for illustration, and is not limited thereto. The bus may be classified into an address bus, a data bus, a control bus, and the like. For ease of representation, only one thick line is used for representing the bus in FIG. 8, but this does not mean that there is only one bus or only one type of bus. In some embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform methods, steps, and logical block diagrams disclosed in embodiments of this application. The general-purpose processor may be a microprocessor, any conventional processor, or the like. Steps of the methods disclosed with reference to embodiments of this application may be directly performed by a hardware processor, or may be performed by using a combination of hardware module and software module in the processor.

In this embodiment of this application, the memory may be a non-volatile memory, for example, a hard disk drive (HDD) or a solid-state drive (SSD), or may be a volatile memory (volatile memory), for example, a random-access memory (RAM). Alternatively, the memory may be any other medium that can be configured to carry or store expected program code in an instruction form or a data structure form and that can be accessed by a computer, but is not limited thereto. Alternatively, the memory in this embodiment of this application may be a circuit or any other apparatus that can implement a storage function, and is configured to store the computer program, the program instructions, and/or the data.

Figure 9:
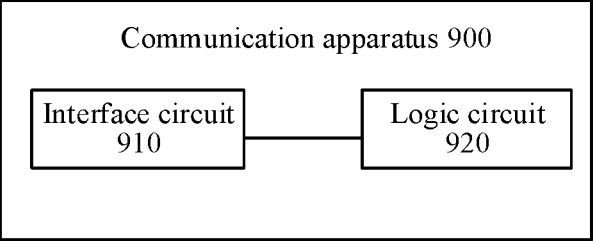
FIG. 9 is a schematic diagram of a structure of a communication apparatus according to an embodiment of this application.

Based on the foregoing embodiments, refer to FIG. 9. An embodiment of this application further provides another communication apparatus 900, including an interface circuit 910 and a logic circuit 920. The interface circuit 910 may be understood as an input/output interface, and may be configured to perform the same operation steps as those of the transceiver unit shown in FIG. 7 or the transceiver shown in FIG. 8. Details are not described herein again in this application. The logic circuit 920 may be configured to run code instructions to perform the method in any one of the foregoing embodiments. The logic circuit 920 may be understood as the processing unit in FIG. 7 or the processor in FIG. 8. The logic circuit 920 may implement the same function as the processing unit or the processor. Details are not described herein again in this application.

Based on the foregoing embodiments, an embodiment of this application further provides a readable storage medium. The readable storage medium stores instructions. When the instructions are executed, the precoding processing method in any one of the foregoing embodiments is implemented. The readable storage medium may include any medium that can store program code, for example, a USB flash drive, a removable hard disk drive, a read-only memory, a random-access memory, a magnetic disk, or an optical disc.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or the block diagrams of the method, the apparatus (system), and the computer program product according to this application. It should be understood that computer program instructions may be used for implementing each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing apparatus to generate a machine, so that the instructions executed by a computer or the processor of another programmable data processing apparatus generate an apparatus for implementing a specific function in one or more procedures in the flowcharts and/or in one or more blocks in the block diagrams.

These computer program instructions may be alternatively stored in a computer-readable memory that can indicate the computer or the other programmable data processing apparatus to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto the computer or the other programmable data processing apparatus, so that a series of operation steps are performed on the computer or the other programmable apparatus to generate computer-implemented processing. Therefore, the instructions executed on the computer or the other programmable apparatus provide steps for implementing a specific function in one or more procedures in the flowcharts and/or in one or more blocks in the block diagrams.

What is claimed is:

1. A precoding processing method, comprising:

determining, by a sending apparatus, precoding information, wherein the precoding information comprises one or more of the following: a precoding codebook, a power of a precoding port, a power of a precoding data stream, or a correspondence between the precoding port and the precoding data stream, wherein one precoding data stream corresponds to one or more precoding ports, the precoding codebook comprises a frequency domain codebook, and the power of the precoding data stream is reported by the sending apparatus, wherein the frequency domain codebook is a codebook in which amplitudes of subcarriers are the same and a phase difference between the subcarriers is constant within a preset frequency band range; and transmitting, by the sending apparatus, the precoding information.

2. The method according to claim 1, wherein the precoding codebook is as follows:

$$A_{K,L} = \begin{bmatrix} a_{1,1} & a_{2,1} & \cdots & a_{1,l} & \cdots & a_{1,L} \\ a_{2,1} & a_{2,2} & & & & \\ \vdots & & \ddots & & & \\ a_{k,1} & & & \ddots & & \\ \vdots & & & & \ddots & \\ a_{K,1} & & & & & a_{K,L} \end{bmatrix},$$

wherein

K indicates a quantity of precoding ports; L indicates a quantity of precoding data streams; $\alpha_{K,L}$ indicates precoding of a $K^{th}$ port in an $L^{th}$ data stream; and each row of $A_{K,L}$ has at most one non-zero element.

3. The method according to claim 2, wherein the non-zero element $\alpha_{K,L}$ in the precoding codebook is $\lambda_K \cdot e^{(1j^*\phi_{K,L}(n))}$; $\lambda_K$ indicates an amplitude and a common phase value of precoding of the port K; and $\phi_{K,L}$ (n) indicates a phase value of mapping the $L^{th}$ data stream to the $K^{th}$ port on an $n^{th}$ frequency domain resource.

4. The method according to claim 1, wherein the power of the precoding data stream comprises one or more of the following:

an inter-stream power coefficient or an inter-stream power difference, wherein the inter-stream power coefficient indicates a power difference value that is between two data streams, and the inter-stream power difference indicates a power difference value that is between M data streams; and M is greater than 2.

5. The method according to claim 1, wherein the power of the precoding port comprises:

a power control coefficient of the port when an inter-port power is not borrowed; or a power allocation proportion of the port when an inter-port power is borrowed.

6. The method according to claim 5, further comprising:

receiving configuration information of the inter-port power, wherein the configuration information of the inter-port power indicates a borrowing status of the inter-port power; and reporting the power of the precoding port based on the configuration information of the inter-port power.

7. The method according to claim 1, wherein before determining precoding information, the method further comprises:

receiving reporting configuration information, wherein the reporting configuration information comprises one or more of the following: the correspondence that is between the precoding port and the precoding data stream and that is selected by the sending apparatus, the codebook selected by the sending apparatus, the power of the precoding data stream, or the power of the precoding port; and the transmitting of the precoding information comprises:

transmitting the precoding information based on the reporting configuration information.

8. A precoding processing method, comprising:

receiving, by a receiving apparatus, precoding information, wherein the precoding information comprises one or more of the following: a precoding codebook, a power of a precoding port, a power of a precoding data stream, or a correspondence between the precoding port and the precoding data stream, wherein one precoding data stream corresponds to one or more precoding ports, the precoding codebook comprises a frequency domain codebook, and the power of the precoding data stream is reported by the sending apparatus, wherein the frequency domain codebook is a codebook in which amplitudes of subcarriers are the same and a phase difference between the subcarriers is constant within a preset frequency band range; and transmitting, by the receiving apparatus, data based on the precoding information.

9. The method according to claim 8, wherein the precoding codebook is as follows:

$$A_{K,L} = \begin{bmatrix} a_{1,1} & a_{2,1} & \cdots & a_{1,l} & \cdots & a_{1,L} \\ a_{2,1} & a_{2,2} & & & & \\ \vdots & & \ddots & & & \\ a_{k,1} & & & \ddots & & \\ \vdots & & & & \ddots & \\ a_{K,1} & & & & & a_{K,L} \end{bmatrix},$$

wherein

K indicates a quantity of precoding ports; L indicates a quantity of precoding data streams; $\alpha_{K,L}$ indicates precoding of a $K^{th}$ port in an $L^{th}$ data stream; and each row of $A_{K,L}$ has at most one non-zero element.

10. The method according to claim 9, wherein the non-zero element $\alpha_{K,L}$ in the precoding codebook is $\lambda_K \cdot e^{(1j*\phi_{K,L}(n))}$; $\lambda_K$ indicates an amplitude and a common phase value of precoding of the port K; and $\phi_{K,L}$ (n) indicates a phase value of mapping the $L^{th}$ data stream to the $K^{th}$ port on an $n^{th}$ frequency domain resource.

11. The method according to claim 8, wherein the power of the data stream comprises one or more of the following:

an inter-stream power coefficient or an inter-stream power difference, wherein the inter-stream power coefficient indicates a power difference value that is between two data streams; the inter-stream power difference indicates a power difference value that is between M data streams; and M is greater than 2.

12. The method according to claim 8, wherein the power of the precoding port comprises:

a power control coefficient of the port when an inter-port power is not borrowed; or a power allocation proportion of the port when an inter-port power is borrowed.

13. The method according to claim 12, further comprising:

transmitting configuration information of the inter-port power, wherein the configuration information of the inter-port power indicates a borrowing status of the inter-port power.

14. The method according to claim 8, wherein before receiving of precoding information, the method further comprises:

transmitting reporting configuration information, wherein the reporting configuration information comprises one or more of the following: reporting the correspondence that is between the precoding port and the precoding data stream and that is selected by the sending apparatus, reporting the codebook selected by the sending apparatus, reporting the power of the precoding data stream, or reporting the power of the precoding port.

15. A sending apparatus, comprising:

a processor, configured to determine precoding information, wherein the precoding information comprises one or more of the following: a precoding codebook, a power of a precoding port, a power of a precoding data stream, or a correspondence between the precoding port and the precoding data stream, wherein one or more precoding ports correspond to one precoding data stream, the precoding codebook comprises a frequency domain codebook, and the power of the precoding data stream is reported by the sending apparatus, wherein the frequency domain codebook is a codebook in which amplitudes of subcarriers are the same and a phase difference between the subcarriers is constant within a preset frequency band range; and a transceiver, configured to transmit the precoding information.

16. The apparatus according to claim 15, wherein the precoding codebook is as follows:

$$A_{K,L} = \begin{bmatrix} a_{1,1} & a_{2,1} & \cdots & a_{1,l} & \cdots & a_{1,L} \\ a_{2,1} & a_{2,2} & & & & \\ \vdots & & \ddots & & & \\ a_{k,1} & & & \ddots & & \\ \vdots & & & & \ddots & \\ a_{K,1} & & & & & a_{K,L} \end{bmatrix}, \text{wherein}$$

wherein

K indicates a quantity of precoding ports; L indicates a quantity of precoding data streams; $\alpha_{K,L}$ indicates precoding of a $K^{th}$ port in an $L^{th}$ data stream; and each row of $\Delta_{K,L}$ has at most one non-zero element.

17. The apparatus according to claim 16, wherein the non-zero element $\alpha_{K,L}$ in the precoding codebook is $\lambda_K \cdot e^{(1j*\phi_{K,L}(n))}$; $\lambda_K$ indicates an amplitude and a common phase value of precoding of the port K; and $\phi_{K,L}(n)$ indicates a phase value of mapping the $L^{th}$ data stream to the $K^{th}$ port on an $n^{th}$ frequency domain resource.

18. The apparatus according to claim 15, wherein the power of the precoding data stream comprises one or more of the following:

an inter-stream power coefficient or an inter-stream power difference, wherein the inter-stream power coefficient indicates a power difference value that is between two data streams, and the inter-stream power difference indicates a power difference value that is between M data streams; and M is greater than 2.

19. The apparatus according to claim 15, wherein the power of the precoding port comprises:

a power control coefficient of the port when an inter-port power is not borrowed; or a power allocation proportion of the port when an inter-port power is borrowed.

20. The apparatus according to claim 19, wherein the processor is further configured to perform:

receiving configuration information of the inter-port power, wherein the configuration information of the inter-port power indicates a borrowing status of the inter-port power; and reporting the power of the precoding port based on the configuration information of the inter-port power.

* * * * *